(12) United States Patent
Stöhr et al.

(10) Patent No.: US 12,202,041 B2
(45) Date of Patent: Jan. 21, 2025

(54) METHOD FOR THE LAYER-BY-LAYER ADDITIVE MANUFACTURING OF A COMPOSITE MATERIAL

(71) Applicant: Siemens Energy Global GmbH & Co. KG, Bayern (DE)

(72) Inventors: Britta Stöhr, Berlin (DE); Jane Kuhn, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 60 days.

(21) Appl. No.: 17/775,280

(22) PCT Filed: Sep. 25, 2020

(86) PCT No.: PCT/EP2020/076841
§ 371 (c)(1),
(2) Date: May 7, 2022

(87) PCT Pub. No.: WO2021/094026
PCT Pub. Date: May 20, 2021

(65) Prior Publication Data
US 2022/0388064 A1    Dec. 8, 2022

(30) Foreign Application Priority Data
Nov. 12, 2019  (DE) .................. 10 2019 217 434.5

(51) Int. Cl.
*B22F 10/28*    (2021.01)
*B22F 10/64*    (2021.01)
(Continued)

(52) U.S. Cl.
CPC ............. *B22F 10/28* (2021.01); *B22F 10/64* (2021.01); *B23K 26/342* (2015.10); *B33Y 10/00* (2014.12);
(Continued)

(58) Field of Classification Search
CPC .......................... B22F 10/28; B22F 2207/17
See application file for complete search history.

(56) References Cited

U.S. PATENT DOCUMENTS

2012/0041586 A1*  2/2012  Abe .................. B22F 10/38
                                                    700/120
2015/0118650 A1*  4/2015  Pressacco .......... A61F 2/4241
                                                    623/21.19
(Continued)

FOREIGN PATENT DOCUMENTS

DE    102011089336 A1    6/2013
DE    102018124192 A1    5/2019
(Continued)

OTHER PUBLICATIONS

Machine Translation, Hes et al., DE 102011089336 A1, Jun. 2013. (Year: 2013).*
(Continued)

*Primary Examiner* — Sally A Merkling
*Assistant Examiner* — Sean P. O'Keefe
(74) *Attorney, Agent, or Firm* — Wolter Van Dyke Davis, PLLC

(57) ABSTRACT

A method for the layer-by-layer additive manufacturing of a composite material having the selective irradiation of a base material to produce a first, dense material phase and to produce a second, porous material phase, wherein the production of the first material phase and the production of the second material phase take place alternately. A correspondingly produced composite material and to a component has the composite material.

10 Claims, 2 Drawing Sheets

(51) Int. Cl.
    *B23K 26/342* (2014.01)
    *B33Y 10/00* (2015.01)
    *B33Y 40/20* (2020.01)
    *B33Y 80/00* (2015.01)
    *B23K 101/00* (2006.01)
    *F01D 25/00* (2006.01)

(52) U.S. Cl.
    CPC .............. *B33Y 40/20* (2020.01); *B33Y 80/00* (2014.12); *B22F 2301/15* (2013.01); *B23K 2101/001* (2018.08); *F01D 25/005* (2013.01); *F05D 2230/31* (2013.01)

(56) References Cited

U.S. PATENT DOCUMENTS

| | | | |
|---|---|---|---|
| 2017/0284206 A1 | 10/2017 | Roberts et al. | |
| 2018/0001236 A1* | 1/2018 | Marchione | B33Y 10/00 |
| 2018/0169757 A1* | 6/2018 | Murao | B29C 64/40 |
| 2018/0221955 A1* | 8/2018 | Pardhi | B22F 5/009 |
| 2018/0250771 A1 | 9/2018 | Brown et al. | |
| 2018/0251163 A1* | 9/2018 | Martin | B33Y 80/00 |
| 2019/0079492 A1* | 3/2019 | Bowden, Jr. | B22F 3/1115 |
| 2019/0135211 A1 | 5/2019 | Ikuta et al. | |
| 2019/0176232 A1* | 6/2019 | Dozier | B22F 12/44 |
| 2019/0299290 A1 | 10/2019 | Kuhns et al. | |
| 2020/0215748 A1* | 7/2020 | Hearne | B29C 64/165 |

FOREIGN PATENT DOCUMENTS

| | | |
|---|---|---|
| EP | 2601006 B1 | 6/2014 |
| EP | 3552692 A1 | 10/2019 |
| WO | 2018005315 A1 | 1/2018 |

OTHER PUBLICATIONS

PCT International Search Report and Written Opinion of International Searching Authority mailed Dec. 2, 2020 corresponding to PCT International Application No. PCT/EP2020/076841 filed Sep. 25, 2020.

* cited by examiner

METHOD FOR THE LAYER-BY-LAYER ADDITIVE MANUFACTURING OF A COMPOSITE MATERIAL

CROSS REFERENCE TO RELATED APPLICATIONS

This application is the US National Stage of International Application No. PCT/EP2020/076841 filed 25 Sep. 2020, and claims the benefit thereof. The International Application claims the benefit of German Application No. DE 10 2019 217 434.5 filed 12 Nov. 2019. All of the applications are incorporated by reference herein in their entirety.

FIELD OF INVENTION

The present invention relates to a method of layer-by-layer additive manufacture of a composite material, for example a hierarchical material. The present invention further encompasses a correspondingly produced material, and a component comprising said material.

The component is advantageously intended for use in a turbo machine, advantageously in the hot gas path of a gas turbine. The component advantageously consists of a superalloy, especially a nickel- or cobalt-based superalloy. The alloy may have been precipitation-hardened or may be precipitation-hardenable. Alternatively, the component may relate to a thermally highly stressed component for use in aerospace and/or the automotive sector.

BACKGROUND OF INVENTION

In gas turbines, thermal energy and/or flow energy from a hot gas generated by combustion of a fuel, for example a gas, is converted to kinetic energy (rotational energy) of a rotor. For this purpose, a flow channel is formed in the gas turbine, in the axial direction of which the rotor or a shaft is mounted. If a hot gas flows through the flow channel, the blades are subjected to a force which is converted to a torque that acts on the shaft, which drives the turbine rotor, and the rotational energy can be utilized, for example, for operation of a generator.

Modern gas turbines are the subject of constant improvement in order to increase their efficiency. However, one result of this is ever higher temperatures in the hot gas path. The metallic materials for blades, especially in the first stages, are constantly being improved with regard to their (mechanical) properties at high temperatures, oxidation stability, cracking resistance, creep resistance and thermomechanical fatigue.

Generative or additive manufacture, on account of its disruptive potential for industry, is also of increasing interest for the mass production of the abovementioned turbine components, for example turbine blades, burner components, or other components.

Additive manufacturing methods include, for example, as powder bed methods, selective laser melting (SLM) or laser sintering (SLS), or electron beam melting (EBM). Further additive methods are, for example, directed energy deposition (DED) methods, especially laser cladding, electron beam or plasma powder welding, wire welding, metallic powder injection molding, sheet lamination methods, or thermal spraying methods (VPS LPPS, GDCS).

A method of selective laser melting is known, for example, from EP 2 601 006 B1.

Additive manufacturing methods have also been found to be particularly advantageous for complex or intricate components, for example labyrinth-like structures, cooling structures or lightweight structures. More particularly, additive manufacturing is notable for a particularly short chain of process steps, since a production or manufacturing step for a component can be based largely on an appropriate CAD file and the choice of appropriate manufacturing parameters. This in particular prevents long product throughput times and delivery times for the components.

In the context of what is called a CAM (computer-aided manufacturing) method, it is possible, for example, in a preparatory step for the manufacture, to fix irradiation parameters and further manufacturing parameters. This can accordingly be effected by a hardware- or software-based route, for example with the aid of a computer program or computer program product.

A computer program product, for example a computer program medium, may be provided or encompassed, for example, in the form of a (volatile or nonvolatile) memory medium, for example a memory card, a USB stick, a CD-ROM or DVD, or else in the form of a downloadable file from a server in a network. The provision can also be effected, for example, in a wireless communications network by the transfer of a corresponding file with the computer program product or the computer program medium. A computer program product may include program code, machine code, G code and/or executable program instructions in general.

The additive manufacturing processes described can in particular advantageously distinctly increase the design freedom of the components achieved compared to conventional methods. However, high-strength materials can generally be additively processed only in very slow processes. Reasons for this include the high intrinsic stresses that arise in the process, caused primarily by process-inherent temperature gradients that can lead to cracking during the build and to mechanical warpage, for example, in a downstream heat treatment. Intrinsic stresses are also of relevance in the case of materials that are less durable or heat-resistant, and even in the case of polymers and ceramic materials, for example, have the effect that the potentials of additive manufacture cannot be fully exhausted.

For example, in the field of high-strength hot gas components, it has not yet been possible to completely solve the problem of cracking, especially with regard to heat cracks or solidification cracks, during additive manufacture or during operation as intended of the component produced.

It is not possible at present to produce or weld precipitation-hardened nickel- or cobalt-based superalloys or alloys having a high gamma or gamma-prime phase content (cf. γ, γ' phase precipitations) with sufficient reproducibility and process reliability by an additive route.

The production of less durable metallic materials is achievable. However, a general problem here too is that of high intrinsic stresses that entail mechanical and/or thermal aftertreatment.

SUMMARY OF INVENTION

It is therefore an object of the present invention to specify means of solving the problems described above. More particularly, the present invention presents a composite material that can be manufactured by an additive route and especially has improved properties with regard to cracking characteristics or crack growth. Advantages of the invention, such as a resulting longer lifetime under stress, therefore arise for any component that at least partly comprises the composite material described.

This object is achieved by the subject matter of the independent patent claims. Advantageous configurations are subject matter of the dependent patent claims.

One aspect of the present invention relates to a method of layer-by-layer additive manufacture of a composite material, for example a hierarchical material, comprising the selective irradiation of a base material for production of a first, dense material phase or material structure, and for production of a second material phase or material structure having a certain porosity. The second material phase is especially different than the first material phase. However, the material phases mentioned may be chemically the same material.

The porosity of the second material phase is advantageously greater than a possibly still remaining unavoidable porosity of the first material phase.

The selective irradiation is advantageously part of a selective laser sintering method, a selective laser melting method or else an electron beam melting method.

The producing of the first material phase and the producing of the second material phase alternate by way of the method described. In other words, during the production of the composite material, the first material phase may first be produced, and then the second material phase, or vice versa. The method is advantageously conducted in such a way that the corresponding material phases are repeatedly produced alternately.

The alternating provision of a dense and a slightly porous material phase for the production of the composite material described advantageously enables the reduction of intrinsic stresses and heat cracks formed in the process. The (hierarchical) material or composite material correspondingly produced by the method described possibly has a reduced strength compared to a largely dense, for example fully melted, material. However, the alternating additive build of the different (first and second) material phases described, in combination with the above-described specific embodiments, advantageously achieves anisotropic crack propagation characteristics during production and also in the operation of the component as intended. Such characteristics are particularly advantageous in the production of high-strength, precipitation-hardened materials that can be (re)processed only with difficulty by mechanical means. Alternatively or additionally, anisotropic and/or targeted mechanical characteristics of the correspondingly produced materials can be achieved in a particularly simple and hence favorable manner.

The advantages of the invention described also include the avoidance of intrinsic stresses in the additive building process, the avoidance of repeated introduction of heat, as is the case, for example, in chessboard-like irradiation strategies, the acceleration of the additive process overall on account of a lower requirement for areal irradiation vectors ("hatching") that have to be scanned with the appropriate weld beam, and a possibly reduced demand for the base material, especially powder.

The composite material achieved has improved or superior mechanical and thermomechanical material properties, such as anisotropic or favored crack propagation characteristics, improved insulation properties through regions of the second material phase having reduced density or elevated porosity, and reduced weight.

In one configuration, the first material phase is produced by complete melting of the base material.

In one configuration, the second material phase is produced by sintering or partial sintering or partial melting of the base material. In the course of sintering or partial sintering, which can be accomplished, for example, by a reduced local energy input—compared to complete melting—during the additive process, the base material is advantageously likewise structurally bonded or consolidated with the first material phase.

In one configuration, the first material phase and the second material phase are produced alternately within one layer, for example in a lateral or lamellar manner, for the composite material.

In one configuration, the first material phase and the second material phase are produced at least partly alternately in a build direction of the composite material. In this configuration, it is advantageously possible to achieve a sandwich-like composite structure with alternating layers of first material phase and second material phase.

In one configuration, both the first material phase and the second material phase are metallic. In this configuration, the base material is appropriately likewise metallic.

In one configuration, both the first material phase and the second material phase are ceramic. In this configuration, the base material is appropriately likewise ceramic.

In one configuration, the first material phase is metallic and the second material phase is ceramic, or vice versa.

In one configuration, the composite material is produced by selective laser melting or laser sintering, or electron beam melting.

In one configuration, an energy input, especially an energy beam, for example a laser output or laser output density, is altered during the production of the composite material at the changeover from the production of the first material phase to the production of the second material phase. This can be accomplished by way of a process preparation, for example via CAM "media".

In one configuration, an energy input is reduced during the production of the composite material at the changeover from the production of the first material phase to the production of the second material phase. Either a reduction or an increase in the energy input can cause porosity, for example, in the structure achieved. Too high a power density of the weld beam (energy beam) can lead, for example, to partial evaporation, scaling or sublimation of the material, whereas too low an energy input chosen can likewise leave porosity in the base material.

In one configuration, the second material phase is produced only by a subsequent heat treatment. In this configuration, the regions of the second material phase can possibly be spared from any irradiation.

A further aspect of the present invention relates to a composite material produced or producible by the method described. The composite material accordingly comprises the first material phase and the second material phase, with regions of the second material phase connecting regions of the first material phase, especially structurally, in at least one direction of expansion, for example the main direction of symmetry, of the material.

In one configuration, the regions of the first material phase are largely or effectively in the form of hexagonal or polygonal platelets or regions.

In one configuration, the regions of the second material phase are present, especially only, in the interstices of the regions of the first material phase. An area content or volume content of the interstices is advantageously distinctly smaller, for example ten times smaller, than a corresponding content of the first material phase.

In one configuration, the base material comprises a nickel- or cobalt-based superalloy, such as "CM 247", "Mar-M247" or "IN939". In addition, the base material may consist of "IN738" or "Rene 80".

In one configuration, the second material phase is disposed within or in the form of a matrix into which the first material phase is embedded.

A further aspect of the present invention relates to a component comprising the composite material, wherein the component is a turbine blade or another component of the hot gas path of a gas turbine.

A further aspect of the present invention relates to a turbine comprising the component described.

Configurations, features and/or advantages that relate to the method in the present context may also relate to the composite material itself or the component, or vice versa.

The expression "and/or" used here, when utilized in a series of two or more elements, means that each of the elements listed may be used alone, or it is possible to use any combination of two or more of the elements listed.

Further details of the invention are described hereinafter with reference to the figures.

DETAILED DESCRIPTION OF INVENTION

Figure 1:
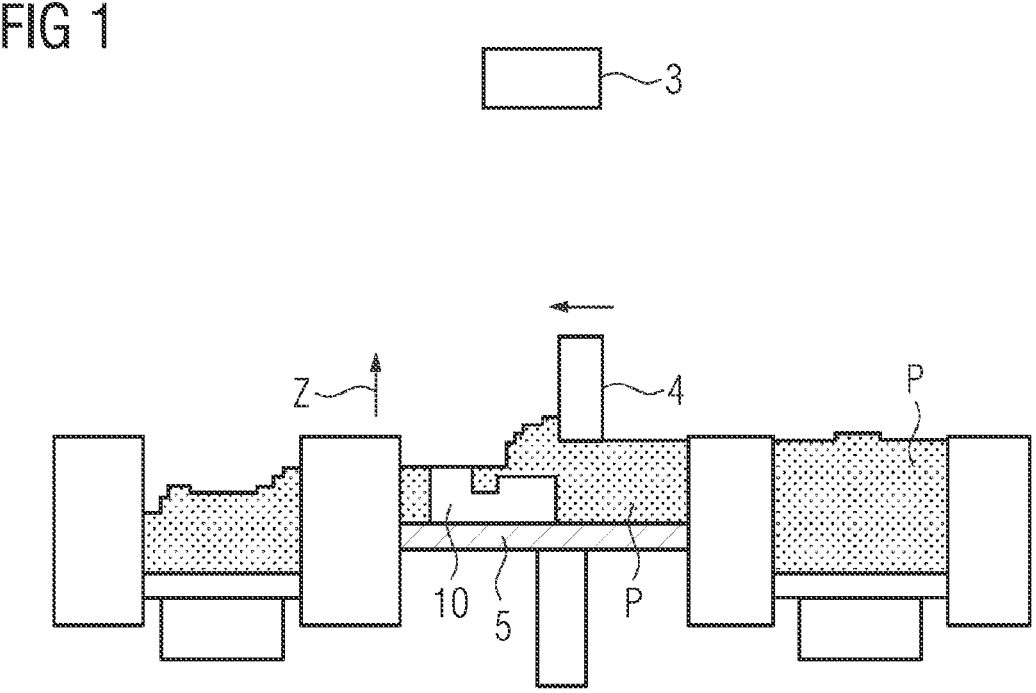
FIG. 1 shows a schematic section view of an additive manufacturing system, indicating an additive, powder bed-based build process.

In the working examples and figures, elements that are identical or have the same effect may each be given the same reference numerals. The elements shown and their size ratios to one another should fundamentally not be considered as being to scale; instead, individual elements, for better illustratability and/or for better understanding, may be shown as being excessively thick or in oversized form.

FIG. 1 shows a plant or apparatus (not indicated explicitly) for layer-by-layer or additive manufacture of a component or workpiece 10.

The component 10 may be a three-dimensional body produced or producible according to any predetermined geometry, which is built by a multitude of individual layers (cf. reference sign L in FIG. 2), for example by means of a beam melting method, such as selective laser melting (SLM), selective laser sintering (SLS) or electron beam melting (EBM).

Component 10 may be a turbine component, for example a part used in the hot gas path of a gas turbine, especially made from a nickel- or cobalt-based superalloy.

In FIG. 1, component 10 is advantageously built up produced only partly and not to completion, i.e. is shown during its additive manufacture.

The system further comprises a coating device 4 for layer-by-layer provision of a powder or base material P for the component 10. The system further comprises vessels (see left and right in the drawing) in which the base material P is advantageously kept for layer-by-layer production of the component 10 and for the corresponding supply and removal.

The system comprises a build platform 5. The build platform 5 is advantageously configured so as to be lowerable.

The system also includes an irradiation device 3, for example a laser or an electron beam device.

In the method of additive manufacture which is also described with reference to FIG. 4, there is layer-by-layer application of base material P and solidification of the (applied) starting material 8, advantageously in succession, such that the component 10 is built/produced step by step in a build direction Z.

The base material P is advantageously a metallic base material. Alternatively, it may be a ceramic material. In addition, the material may be a material having metallic and ceramic material properties and/or what is called an MCrAlY alloy or a "cermet" material.

After the production or the build of a single layer for the workpiece 1, the build platform 5 is further lowered, advantageously by a measure corresponding to the layer thickness L, followed by individual melting, for example with a laser beam, and solidification. Typically, in the case of such powder bed-based processes, a layer thickness may be between 20 and 40 μm. According to the predetermined dimension, selective irradiation of several thousand or several tens of thousands of individual layers may thus be necessary.

In the SLM method, in the course of solidification, a powder bed is especially scanned point by point, line by line, or over its area, and/or is advantageously irradiated according to a defined irradiation geometry comprising a multitude of irradiation vectors. Corresponding data for the exposure geometry are advantageously taken from a CAD file or a corresponding dataset.

As an alternative to the SLM method, the layer-by-layer production method may relate to selective laser sintering (SLS) or electron beam melting (EBM).

Figure 2:
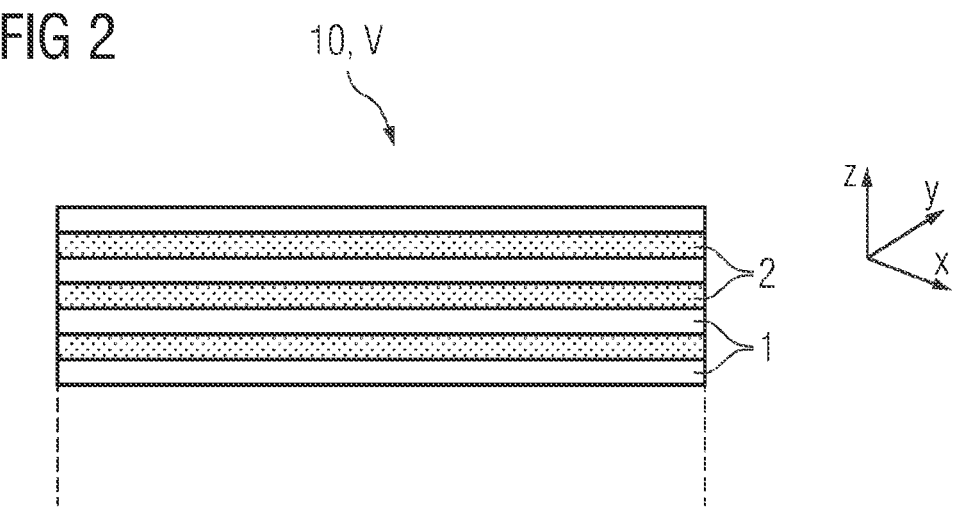
FIG. 2 shows, in a simplified schematic section view, a composite material of the invention.

FIG. 2 shows a schematic side view or section view of a component 10. The component 10 has, at its top end or tip, a composite material V. The composite material V is advantageously additively manufactured by the method described with reference to FIG. 4.

This configuration of the component 10 or composite material V may, for example, represent a turbine blade or part thereof.

The composite material V has a first material phase 1 and the second material phase 2, with regions of the second material phase 2 connecting regions of the first material phase 1 in at least one direction of expansion, in the present configuration the vertical z direction.

Without restriction of generality, the sequence of layers or material phases 1 and 2 may be arranged or formed in any other spatial direction or main direction of extension (cf. reference signs X, Y) of the corresponding component.

More particularly, component 10 may accordingly comprise a layer stack of layers 1 and 2. A layer thickness is identified by way of example by reference sign L. Even though this is not shown explicitly, the layer thickness of layers 1 may differ from that of layers 2. Moreover, the layer thicknesses of the layers in the stack may vary overall.

The layers 1 are advantageously the first material phase 1. The layers 2 are advantageously the second material phase 2. Accordingly, the layers and the material phases may be referred to synonymously. Advantageously, a layer at least partly or completely comprises the correspondingly identified material phase.

The layer stack shown may, for example, be a sandwich structure at the tip of a turbine blade.

The second material phase or arrangement thereof may correspond to that of a matrix into which the first material phase is embedded.

In the diagram of FIG. 2, the matrix of the second material phase may be an interlamellar matrix.

The first material phase 1 advantageously has a dense material structure without significant porosity.

The second material phase advantageously has a certain porosity.

In other words, the blade tip described advantageously alternately has completely or largely dense and porous layers, with the dense layers 1 having been produced by complete melting with an energy beam (cf. reference numeral 3 in FIG. 1), and the porous layers 2 by merely partial melting, sintering or partial sintering. This appropriately leaves a certain porosity in the layers 2.

Even though the turbine blade tip described can have reduced strength, for example by comparison with a volume material with a completely molten structure, crack propagation characteristics in particular in radial (vertical) direction are improved. In addition, in the case of a correspondingly chosen alloy, for example what is called "Alloy247" Mar-M247, In939 ("Inconel 939"), In738 or Rene 80, it is possible to achieve improved oxidation stability or improved high-temperature stability.

An advantageous application may, as shown, be a turbine blade tip in the high-temperature sector, for example the first or second turbine stage.

Figure 3:
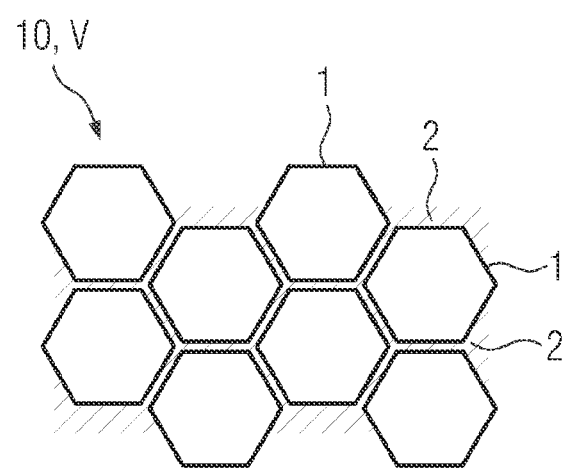
FIG. 3 shows, in a simplified schematic top view, a composite material of the invention.

FIG. 3 indicates, by a schematic top view, an alternative configuration of the composite material V of the invention. Again, regions of the first material phase 1 and of the second material phase 2 are shown.

By contrast with the diagram of FIG. 2, the regions of the first material phase 1 are largely or effectively in the form of hexagonal platelets, and the regions of the second material phase 2 are disposed in interstices of the regions of the first material phase 1, and connect them.

The technical advantages of the composite materials presented in the embodiments described so far, or correspondingly formed hierarchical structures of material phases, are that the intrinsic stresses that occur in the additive building process, and also those that occur only subsequently in the operation as intended or the use of the component, can advantageously be reduced.

More particularly, it is possible by suitable mutual arrangement of the first and second material phases to create anisotropic, tailored or improved crack propagation characteristics. The typical effects of the shear strengthening that are utilized in composite materials, for example comprising a crack deflection, crack attenuation or crack bridging function, what is called "pullout" of the (completely) dense regions and sliding of the corresponding layers, can advantageously likewise be utilized in the material created in the present context.

The configuration indicated by way of example by FIG. 3 may especially be designed similarly to a natural mother-of-pearl material or emulated correspondingly.

For example, a proportion by volume or mass of the first material phase 1 may be between 80% and 95% of the composite material V. Accordingly, the corresponding proportion of the second material phase 2 may be between 5% and 20% in the composite material V. The first material phase 1 may—as shown—be in the form of regions of hexagonal platelets having dimensions or diameters of 5 to 15 μm and heights corresponding to one or more layer thicknesses L.

According to the diagram in FIG. 3, the matrix of the second material phase may be an intertabular matrix.

Figure 4:
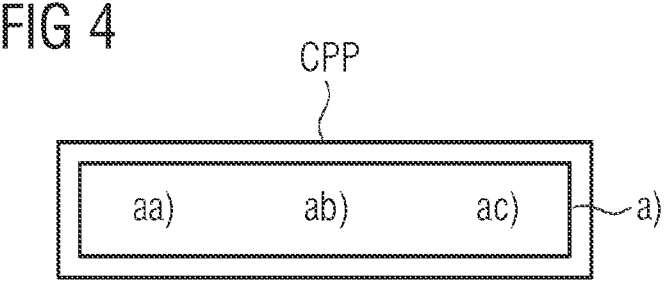
FIG. 4 indicates, by a schematic diagram, process steps of the invention.

FIG. 4 indicates, by a schematic diagram, a method of the invention for layer-by-layer additive manufacture of a composite material V. The method comprises a), the selective irradiating of the base material P for production of the first dense material phase 1, and for production of a second porous material phase 2, wherein the producing of the first material phase 1 and the producing of the second material phase 2 are effected alternately or successively.

Method step aa) is supposed to indicate that an energy input, which can be established by way of the additive methods described, for example, via regulation or control of the radiative output or of the energy density correspondingly introduced in time or space in the process, can be altered at the changeover from the production of the first material phase 1 to the production of the second material phase 2.

In method step ab), an energy input can especially be reduced during the production of the composite material V at the changeover from the production of the first material phase 1 to the production of the second material phase 2 (see above).

More particularly, by way of the described production of the second material phase 2, this can be solidified only in a step downstream of the actual additive build, especially by a subsequent heat treatment (cf. reference sign ac)).

The fixing of irradiation parameters, comprising the described energy input into a powder bed composed of the base material P mentioned, can be effected directly by way of a preparation step for the actual additive manufacture. Especially the fixing or assignment of specific build parameters, such as the layer thickness L or the energy input mentioned (not identified explicitly) relative to geometric data (CAD) of the component 10, can be effected by way of a CAM method.

The advantages of the invention are thus possibly manifested even in a preparation for manufacture, and can be distributed and utilized in the form of functional CAM data. Accordingly, the method specified, indicated by the reference sign CPP, may be at least partly computer-implemented.

Figure 5:
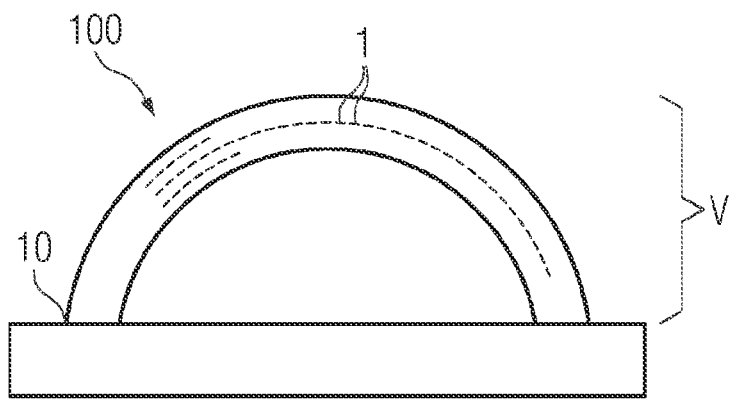
FIG. 5 indicates, in a simplified view, a turbine component comprising the composite material of the invention.

FIG. 5 indicates, by a schematic view, a component 10 in a further configuration. What is shown more particularly is that the component described may relate to a housing portion of a turbo machine, for example a gas turbine. The advantageous anisotropic crack propagation characteristics described, or improved material characteristics with regard to crack propagation, may be exploited in at least one fixed direction of the component, for example in radial direction or in circumferential direction.

It is apparent that a curved portion of the housing consists of or comprises the composite material V. The structures identified by dotted lines in this portion, in the present context, are intended to identify the first material phase 1, which, in the embodiments described in FIGS. 2 and 3, may be arranged either in layers one top of another or in one and the same layer alternately with an otherwise unspecified second material phase.

This configuration advantageously enables improvement of propagation of cracks that are possibly already initiated during the additive manufacture, both in circumferential direction of the arc identified in FIG. 5 and radially thereto.

Alternatively, the component 10 may be another component of a turbo machine, for example a component which is used in the hot gas path of a turbo machine, for example a gas turbine. In particular, the component may refer to a blade or vane, a ring segment, a burner part or a burner tip, a shroud, a shield, a heat shield, a nozzle, a seal, a filter, an opening or probe, a resonator, a ram or a cyclone, or a corresponding transition or insert or a corresponding retrofitted part.

The invention is not limited to the working examples by the description with reference thereto, but encompasses any novel feature and any combination of features. This especially includes any combination of features in the patent claims, even if this feature for this combination is not itself specified explicitly in the patent claims or working examples.

The invention claimed is:

1. A method of layer-by-layer additive manufacture of a composite material, comprising:
    selectively irradiating a base material for production of a first material phase, and for production of a second material phase having a porosity greater than a porosity of the first material phase,
    wherein the production of the first material phase and the production of the second material phase alternate,
    wherein the first material phase and the second material phase are produced alternately within a layer for the composite material,
    wherein within the layer:
        the first material phase forms discrete regions in the layer, wherein the discrete regions comprise a hexagonal shape; and
        the second material phase is disposed in interstices between the discrete regions and connects the discrete regions, and
    wherein an energy input during the production of the composite material is reduced at a changeover from the production of the first material phase to the production of the second material phase.

2. The method as claimed in claim 1,
    wherein the first material phase is produced by complete melting of the base material, and the second material phase is produced by sintering of the base material.

3. The method as claimed in claim 1,
    wherein both the first material phase and the second material phase are metallic.

4. The method as claimed in claim 1,
    wherein the composite material is produced by selective laser melting.

5. The method as claimed in claim 1,
    wherein the production of the second material phase is effected only by a subsequent heat treatment.

6. The method as claimed in claim 1, the method further comprising:
    forming a hot gas path component of a gas turbine engine comprising the layer.

7. The method as claimed in claim 1, further comprising:
    forming a plurality of layers comprising the layer;
    wherein the hexagonal shape spans at least two layers of the plurality of layers.

8. A method of layer-by-layer additive manufacture of a composite material, comprising:
    selectively irradiating a base material for production of a first material phase, and for production of a second material phase having a porosity greater than a porosity of the first material phase,
    wherein the production of the first material phase and the production of the second material phase alternate,
    wherein the first material phase and the second material phase are produced alternately within a layer for the composite material,
    wherein within the layer:
        the first material phase forms discrete regions in the layer, wherein the discrete regions comprise a hexagonal shape; and
        the second material phase is disposed in interstices between the discrete regions and connects the discrete regions, and
    wherein an area content or volume content of the interstices is smaller than a corresponding content of the first material phase.

9. The method as claimed in claim 8,
    wherein the area content of the interstices is ten times smaller than a corresponding area content of the first material phase.

10. The method as claimed in claim 8,
    wherein the volume content of the interstices is ten times smaller than a corresponding volume content of the first material phase.

* * * * *